United States Patent [19]
Sechrist et al.

[11] Patent Number: 5,757,561
[45] Date of Patent: May 26, 1998

[54] PRECISION OPTICAL MOUNTS

[75] Inventors: Paul F. Sechrist, Laguna Niguel; Millard A. Nunnally, Mission Viejo, both of Calif.

[73] Assignee: Newport Corporation, Irvine, Calif.

[21] Appl. No.: 756,762

[22] Filed: Nov. 26, 1996

[51] Int. Cl.$^6$ ........................................... G02B 7/02
[52] U.S. Cl. ........................ 359/822; 359/819; 359/823; 359/818
[58] Field of Search ......................... 359/822, 820, 359/823, 819, 818

[56] References Cited

U.S. PATENT DOCUMENTS 5,140,470  8/1992  Luecke .................... 359/818

Primary Examiner—Frank G. Font
Assistant Examiner—Reginald A. Ratliff
Attorney, Agent, or Firm—Morland C. Fischer

[57] ABSTRACT

Precision optical mounts that carry and reliably position an optical element so that a plurality of such optical mounts can be arranged in a compact and optically efficient system, wherein opposing optical elements are held in relatively close proximity to one another without introducing distortion. A stationary back plate is arranged in spaced facing alignment with a face plate for importing a tilting or translational movement to the face plate and to an optical element that is to be carried thereby. The optical mount may be disposed in vertical, upstanding alignment with respect to a support surface to position the optical element (e.g. a mirror) to receive a beam of optical energy. In the alternative, the optical mount may function as a mounting platform to be disposed in horizontal alignment with respect to the support surface so that an optical element (e.g. a prism) can be supported thereupon.

20 Claims, 8 Drawing Sheets

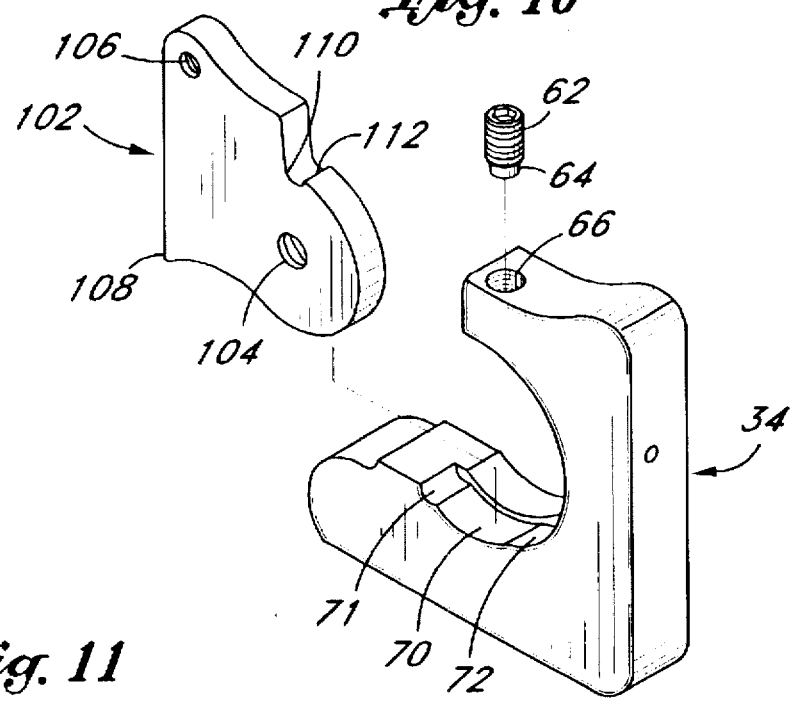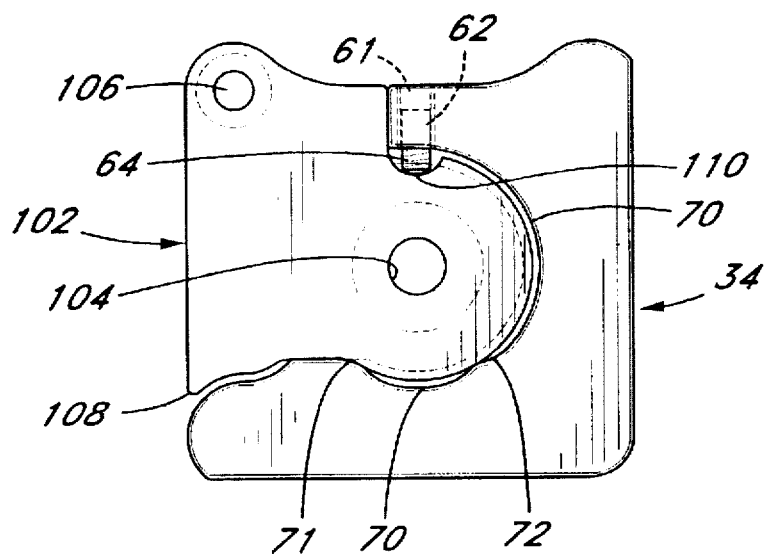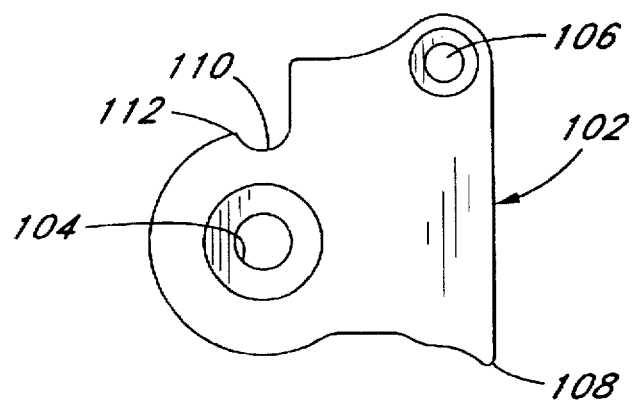

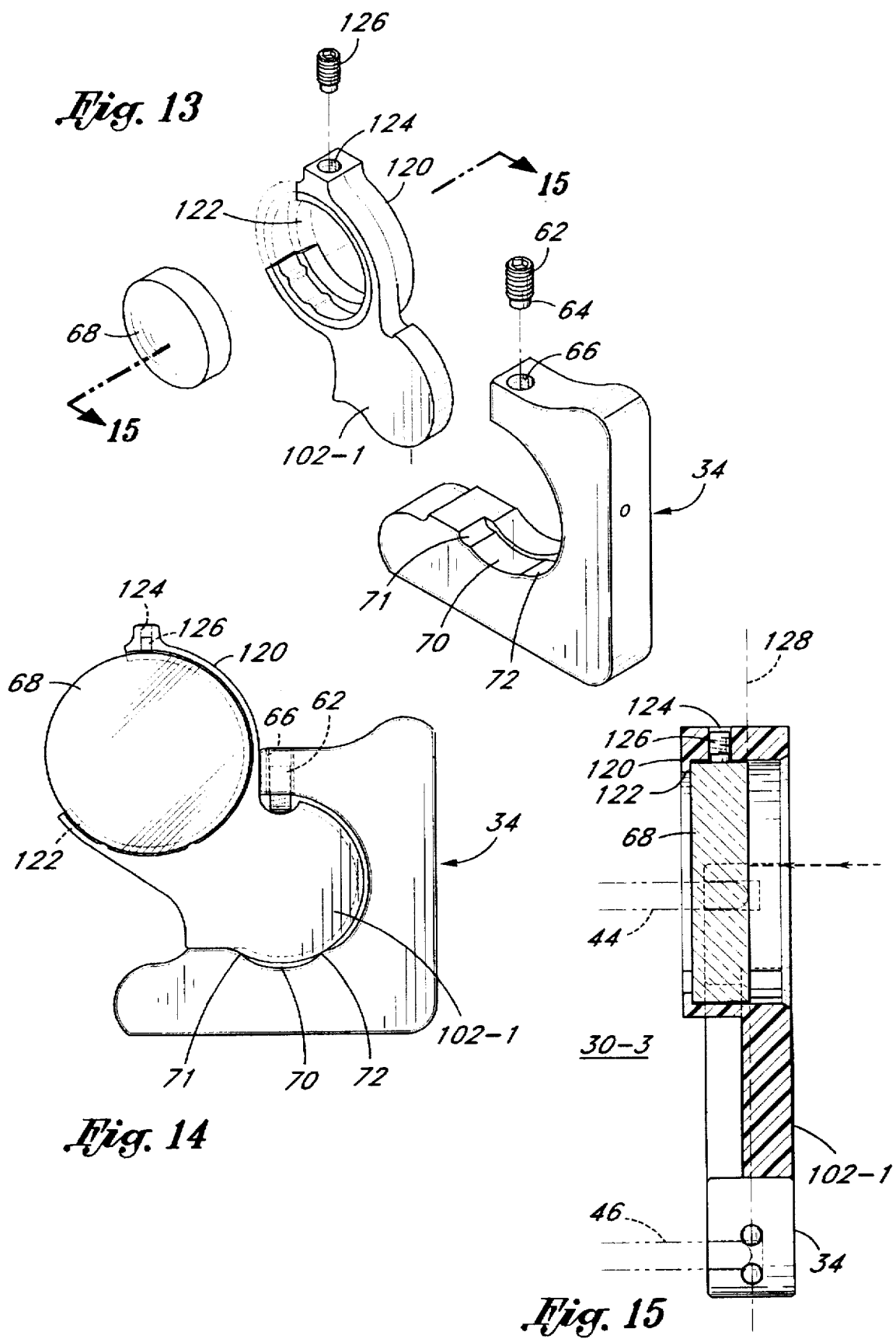

PRECISION OPTICAL MOUNTS

BACKGROUND OF THE INVENTION

1. Field of the Invention

This invention relates generally to precision optical mounts that carry and reliably position an optical element (e.g. a mirror or a prism), so that a plurality of such optical mounts can be arranged in a compact and optically efficient system wherein space consumption is minimized without introducing distortion.

2. Background Art

Referring to FIG. 1 of the drawings, optical mounts 1 are known which include a generally solid, rectangular back plate 2 and a face plate 4. The back and face plates 2 and 4 are coupled in spaced facing alignment with one another. The face plate 4 carries an optical element 6 (e.g. a mirror) and is adapted to be moved by means of rotatable knobs 8 having threaded shafts 10 that extend through the back plate 2 to be advanced into contact with face plate 4 and thereby impart a tilting or translational movement to the face plate so that the position of the optical element 6 may be correspondingly changed relative to an incident beam of optical energy.

As a consequence of the solid, rectangular configuration of the face plate 4, two or more of the optical mounts 1 must be spaced from one another by a relatively large distance. Moreover, a relatively wide angle $\alpha_1$ is introduced to the reflected beam that is transmitted between the optical element 6 of the opposing optical mounts 1. The aforementioned large distance $d_1$ and the large angle of reflection $\alpha_1$ is caused by the necessity of having to separate the optical mounts 1 and adjust the position of the optical elements 6 to ensure that the reflected optical energy will not be intercepted and blocked by the rectangular face plate 4. As a result of the foregoing, the space consumed by a plurality of the optical mounts 1 is undesirably large making the optical system inefficient for use in applications where only a small space is available.

SUMMARY OF THE INVENTION

According to a first embodiment of the invention, a precision optical mount is disclosed having a generally L-shaped back plate that is coupled in spaced, facing alignment to a generally C-shaped face plate by means of a pair of plate positioning springs. A set of interchangeable modular actuators extends through the back plate to contact the face plate so that the face plate can be moved (i.e. tilted) relative to the back plate. The face plate has a centrally disposed optics carrying seat at which an optical element (e.g. a mirror) is held by a three point kinematic support including a pair of hard optic contacts and a nylon tipped retaining screw so that a movement of the face plate by the actuators is imparted to the optical element. By virtue of the L-shaped back plate and C-shaped face plate, an optical mount is available wherein a common corner or quadrant of each plate is open or clear so that a beam of optical energy can be transmitted therethrough without being intercepted and blocked in order to facilitate the construction of a compact and optically efficient system in which a plurality of opposing optical mounts can be arranged in close proximity to one another.

According to a second embodiment of the invention, a precision optical mount is disclosed having a solid rectangular face plate coupled in spaced facing alignment to the aforementioned L-shaped back plate so as to be moveable relative thereto. A unique adapter disk is affixed to the back plate and cradled between the legs thereof. A threaded hole extends axially through the adapter disk to enable the back plate to be used as a horizontal mounting platform. A threaded rod, or the like, extends from a support surface (e.g. a table or a post) to be attached to the adapter disk at the threaded hole thereof, whereby to retain the face plate above the support surface so as to advantageously permit an optical element (e.g. a prism) to rest thereupon. The base of a clamp extends through another hole that is formed at a corner of the rectangular face plate by which to permit the optical element to be reliably held on the face plate.

According to a third embodiment of the invention, a precision optical mount is disclosed having the aforementioned L-shaped and C-shaped back and face plates coupled to one another in spaced facing alignment. An optics holder is detachably connected to the moveable face plate by means of a mounting platform that is retained by the three point support at the centrally disposed optics carrying seat of the face plate. The optics holder receives and positions an optical element (e.g. a mirror) such that the front face of the optical element is held in alignment with a plane along which the actuators of the back plate contact the face plate to impart a movement thereto. Moreover, the point at which the optical element is connected to the optics holder is offset relative to the coplanar alignment of the face of the optical element with the contact points of the actuators. By virtue of the foregoing, the optical element is adapted for true gimballed motion when the face plate is moved by a pair of actuators relative to the back plate.

BRIEF DESCRIPTION OF THE DRAWINGS

FIG. 7 is an exploded view of a precision optical mount according to a second embodiment of this invention;

FIGS. 10–12 illustrate a precision optical mount according to a third embodiment of this invention; and FIGS. 13–15 illustrate a modification to the optical mount of FIGS. 10–12.

DETAILED DESCRIPTION

Figure 1:
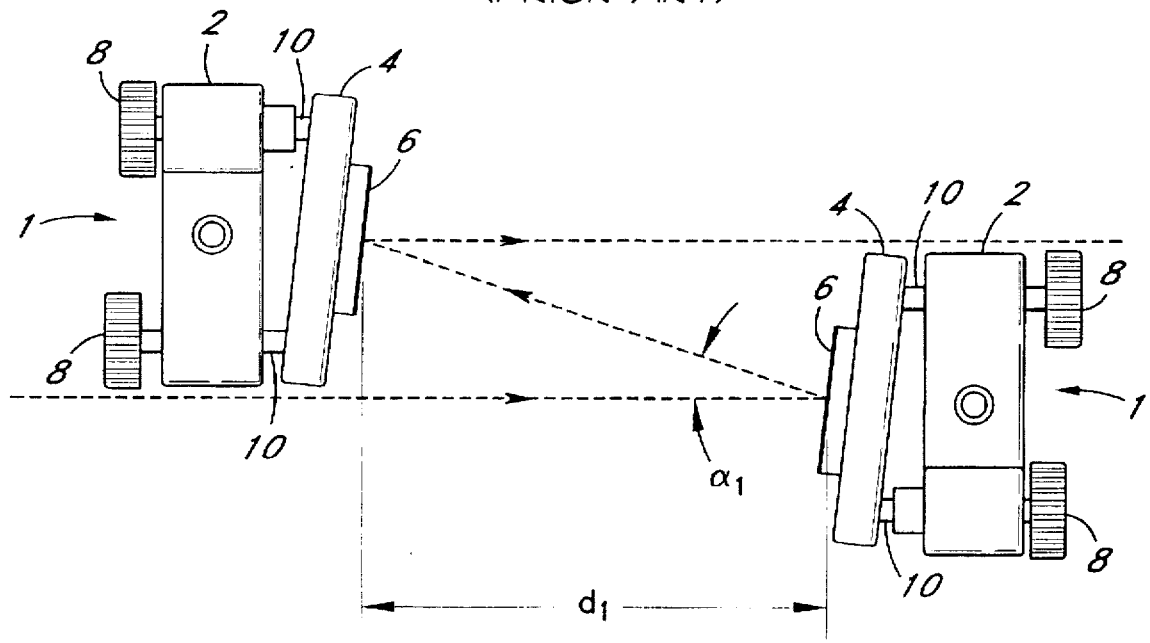
FIG. 1 shows an optical system in which a pair of conventional optical mounts are arranged to reflect a beam of optical energy therebetween.

The precision optical mounts 30 and 30-1 according to a first embodiment of the present invention are disclosed while referring concurrently to FIGS. 3–6 of the drawings. Each of the optical mounts 30 and 30-1 has a stationary back plate 32 and a moveable face plate 34 that are coupled in spaced facing alignment with one another. As an important detail of the optical mounts 30 and 30-1, the back plate 32 has a right angle configuration and is shaped like the letter "L." A set of three laterally extending actuator retaining holes 36, 38, and 40 (best shown in FIGS. 4 and 5) are formed through the back plate 32. More particularly, an actuator retaining hole 36 and 40 is located at the outward end of each of a pair of perpendicular legs 41 and 42 that are coextensively connected to one another to form the L-shaped back plate 32. The third actuator retaining hole 38 is located at the intersection of the legs 41 and 42.

Figure 3:
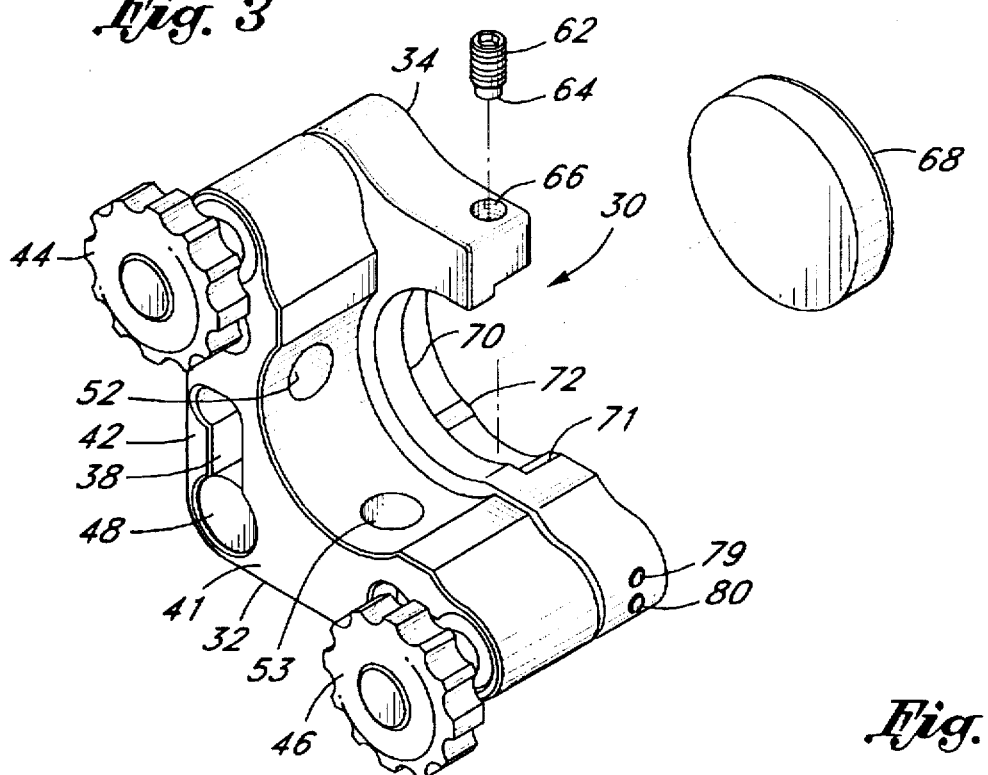
FIG. 3 is a perspective view of a precision optical mount according to a first embodiment of this invention.
Figure 4:
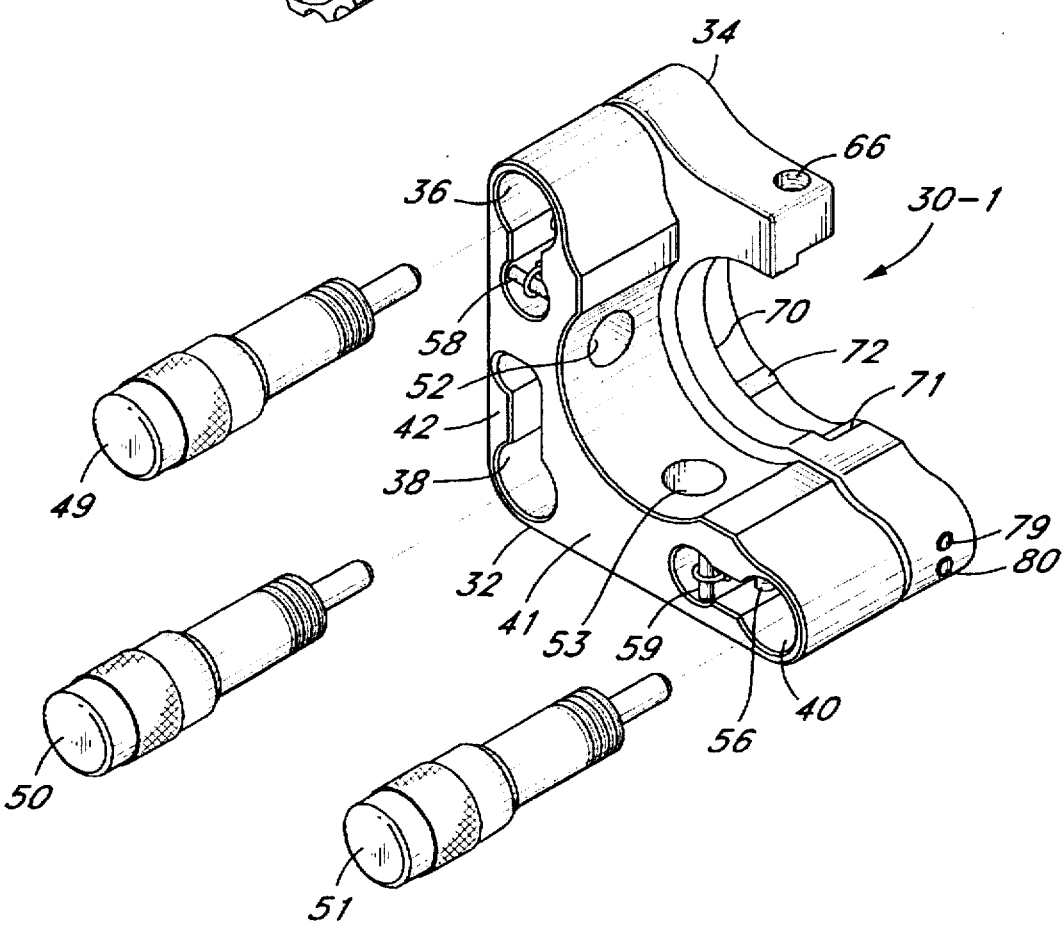
FIG. 4 is a perspective view of the optical mount of FIG. 3 including a modification.
Figure 5:
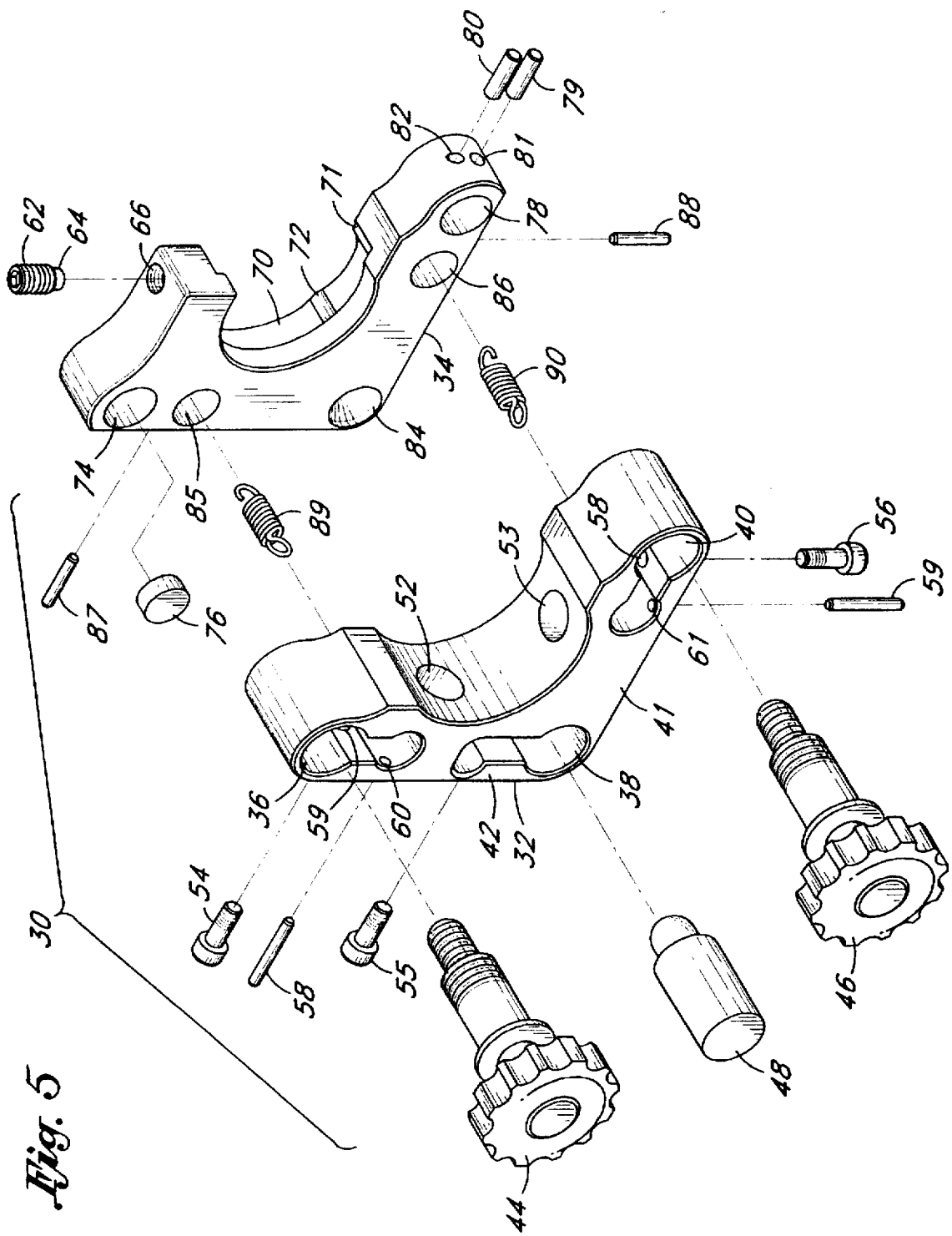
FIG. 5 is an exploded view of the optical mount of FIG. 3.
Figure 6:
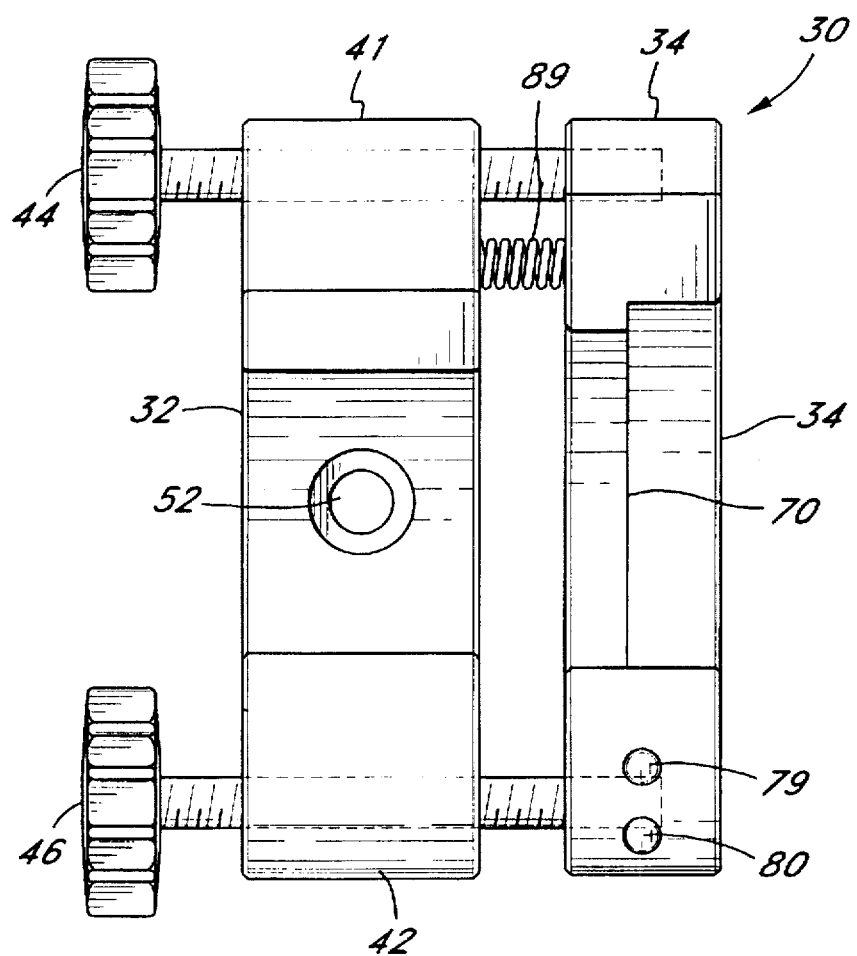
FIG. 6 is a front view of the optical mount of FIG. 3.
Figure 2:
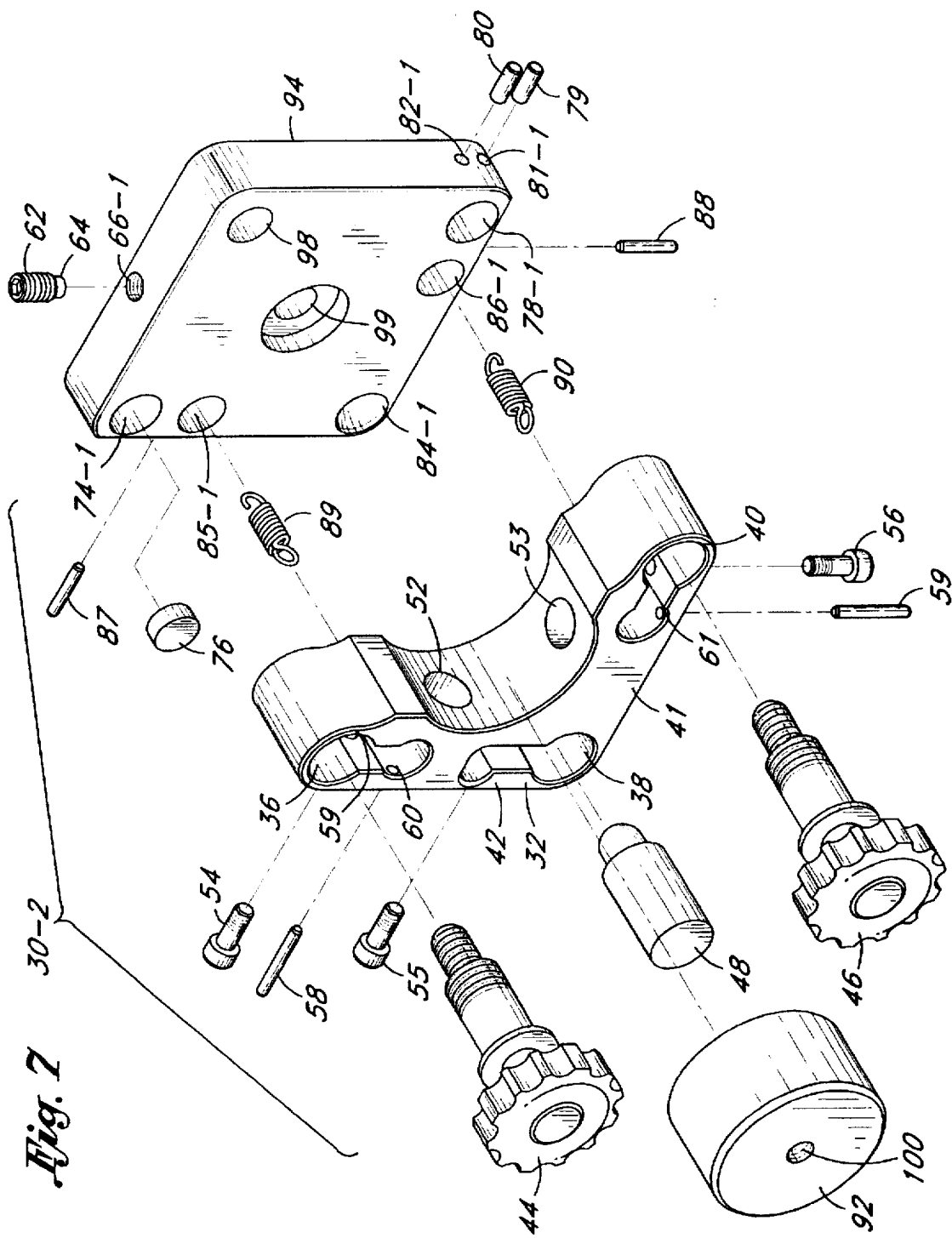

In the case of the optical mount 30 shown in FIGS. 3 and 5, a pair of interchangeable modular actuators 44 and 46 are received in respective actuator retaining holes 36 and 40. The actuators 44 and 46 are adapted to be rotated within and axially advanced through their retaining holes 36 and 40 to permit 2-axis positioning of the moveable face plate 34 relative to the stationary back plate 32. A pivot bushing 48 is received in the third actuator hole 38 to establish a pivot surface around which the moveable face plate 34 can rotate. In the case of the optical mount 30-1 shown in FIG. 4, micrometer actuators 49, 50 and 51 are received at respective actuator retaining holes 36, 38 and 40 to be rotated therein and axially advanced therethrough in order to permit a repeated and controlled 2-axis positioning as well as translation of the moveable face plate 34 relative to the stationary back plate 32.

A pair of mounting through holes 52 and 53 are formed through the legs 41 and 42 of back plate 32 in transverse alignment with the direction of the actuator retaining holes 36, 38 and 40. The through holes 52 and 53 are sized to receive conventional fasteners (not shown) by which to affix the associated optical mounts 30 and 30-1 in upstanding vertical alignment against a support surface, such as a table, a post, or the like.

Referring specifically to FIG. 5, there is shown a set of three clamping screws 54, 55 and 56 to be moved through a corresponding set of three screw holes (e.g. 58 and 59) and inwardly of the legs 41 and 42 of back plate 32. The clamping screws 54, 55, and 56 extend transversely through respective actuator retaining holes 36, 38 and 40 so as to apply a squeezing or clamping force and thereby prevent the removal of the modular actuators 44 and 46 and the pivot bushing 48. Of course, the clamping screws 54–56 can be withdrawn from holes 36, 38 and 40 when it is desirable to remove the interchangeable actuators 44 and 46 and the pivot bushing 48 to convert the optical mount 30 from one actuator drive (as shown in FIG. 5) to the optical mount 30-1 having another drive (as shown in FIG. 4), or visa versa.

Also shown in FIG. 5 are a pair of spring retaining pins 58 and 59 positioned through a corresponding pair of pin holes 60 and 61 and inwardly of the legs 41 and 42 of back plate 32. The spring retaining pins 58 and 59 extend transversely through respective actuator retaining holes 36 and 40 to capture and retain first ends of a pair of soon to be described plate positioning springs 89 and 90 that couple the back and face plates 32 and 34 of the optical mounts 30 and 30-1 in spaced facing alignment with one another so that the position of the face plate 34 can be adjusted relative to the stationary back plate 32, depending upon the rotation and axial displacement of actuators 44 and 46 or micrometer actuators 49–51.

As another important detail of each of the optical mounts 30 and 30-1 of FIGS. 3–6, the moveable face plate 34 thereof is generally shaped like the letter "C." An optics retaining screw 62 having a nylon tip 64 is received through a screw hole 66 at the top end of the C-shaped face plate 34 so as to extend downwardly and into mating engagement with the optical element 68 (of FIG. 3) that is to be supported and selectively positioned by either of the optical mounts 30 or 30-1. To this end, a generally semi-circular optics carrying seat 70 is recessed into the face plate 34. The back of seat 70 is located in a plane that includes the pivot points at which the actuators (of FIGS. 3 and 4) contact the face plate 34. Projecting inwardly from the bottom end of the face plate 34 is a first hard optic contact 71. Projecting outwardly from the optics carrying seat 70 (at a location between the top and bottom ends of the face plate 34) to also engage the optical element 68 is a second hard optic contact 72.

It should be appreciated that the nylon tip 64 of the optics retaining screw 62 projecting downwardly from the top end of the C-shaped face plate 34, the first hard optic contact 71 projecting upwardly from the bottom end of face plate 34, and the second hard optic contact 72 projecting outwardly from optics carrying seat 70 cooperate with one another to support and carry the optical element 68 for exact and repeatable relocation with the moveable face plate 34. It should also be appreciated that the nylon tip 64 and the first and second hard optic contacts 71 and 72 establish a 3-point kinematic support which advantageously replaces conventional optical supports that have been known to include temperature and age sensitive plastic pins.

The optical element 68 that is carried at the aforementioned 3-point kinematic support is typically a reflective mirror. However, it is to be understood that the optical element 68 to be associated with the optical mounts 30 and 30-1 can also be partially reflective or totally transmissive for purposes of optical beam shaping.

Referring once again to FIG. 5, there is shown a first laterally extending hole 74 formed at the top of the moveable face plate 34 which lies in opposing alignment with the actuator retaining hole 36 through the stationary back plate 32. A flat pad 76 is located within the hole 74 to create a planer surface against which the actuator 44 (or the micrometer actuator 49) will be received so that an axial displacement of the actuator 44 through the actuator retaining hole 36 of the stationary back plate 32 will be transferred to the moveable face plate 34 at the flat pad 76.

A second laterally extending hole 78 is formed at the bottom end of the face plate 34 so as to lie in opposing alignment with the actuator retaining hole 40 through back plate 32. A pair of pins 79 and 80 extend through a pair of corresponding pin holes 81 and 82 in the face plate 34 so as to be transversely aligned with respect to the laterally extending hole 78. The pins 79 and 80 cooperate with one another to create a V-shaped groove at the interior of hole 78 against which the actuator 46 (or the micrometer actuator 51) will be received so that an axial displacement of the actuator 46 through the actuator retaining hole 40 of the stationary back plate 32 will be transferred to the moveable face plate 34 at the V-shaped groove formed by pins 79 and 80.

A third laterally extending hole 84 is formed at the mid point of the face plate 34 between the top and bottom ends thereof. The hole 84 is conically shaped and projects inwardly of the face plate 34 so as to lie in opposing alignment with the actuator retaining hole 38 through back plate 32. The hole 84 creates a conical surface against which the pivot bushing 48 (or the micrometer actuator 50) is received so that the moveable face plate 34 will be adapted for either translational or tilting displacement relative to the stationary back plate 32 depending upon whether the pivot bushing 48 (of FIG. 5) or the micrometer actuator 50 (of FIG. 4) is received through the actuator retaining hole 38 to engage the moveable face plate 34 within the conically shaped hole 84.

A pair of spring receiving pockets 85 and 86 are formed at the top and bottom ends of the moveable face plate 34 adjacent respective ones of the laterally extending holes 74 and 78. A pair of spring retaining pins 87 and 88 extend through the face plate 34 in transverse alignment with respective spring receiving pockets 85 and 86. The spring retaining pins 87 and 88 capture and retain the second ends of plate positioning springs 89 and 90. That is, the plate positioning springs 89 and 90 (e.g. preferably helically wound springs manufactured from steel) are held at their opposite ends by the retaining pins 58 and 59 running through the actuator retaining holes 36 and 40 of back plate 32 and the retaining pins 87 and 88 running through the spring receiving pockets 85 and 86 of face plate 34 so that the alignment of the back and face plates 32 and 34 can be selectively adjusted relative to one another depending upon the rotation and the corresponding distance over which the actuators 44 and 46 (or the micrometer actuators 49–51) of the stationary back plate 32 have been displaced relative to the moveable face plate 34 to achieve the required positioning of the optical element 68 that is carried at the 3-point kinematic support (i.e. 64, 71 and 72) of face plate 34.

The operation of the optical mounts 30 and 30-1 of FIGS. 3–6 is briefly described for positioning the optical element 68 through translational and/or tilting movements to achieve a desired orientation relative to an incident beam of optical energy (e.g. light). The axial displacement of any one of the actuators 44 or 46 or the micrometer actuators 49, 50 or 51 towards face plate 34 will impart a tipping movement to the optical element 68. The axial displacement of both actuators 44 and 46 will cause optical element 68 to rotate as the moveable face plate 34 correspondingly rotates around pivot bushing 48. The axial displacement of a pair of adjacent micrometer actuators 49 and 50 or 50 and 51 will impart a translational movement to the optical element 68.

Figure 8:
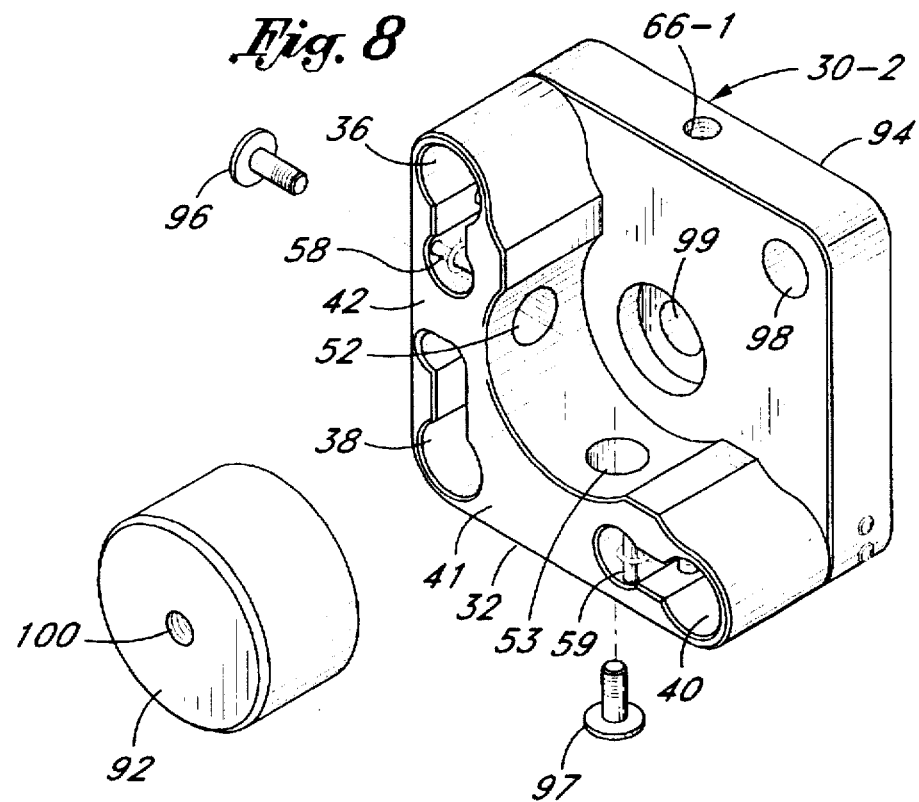
FIG. 8 is a partially exploded perspective view of the optical mount of FIG. 7.
Figure 9:
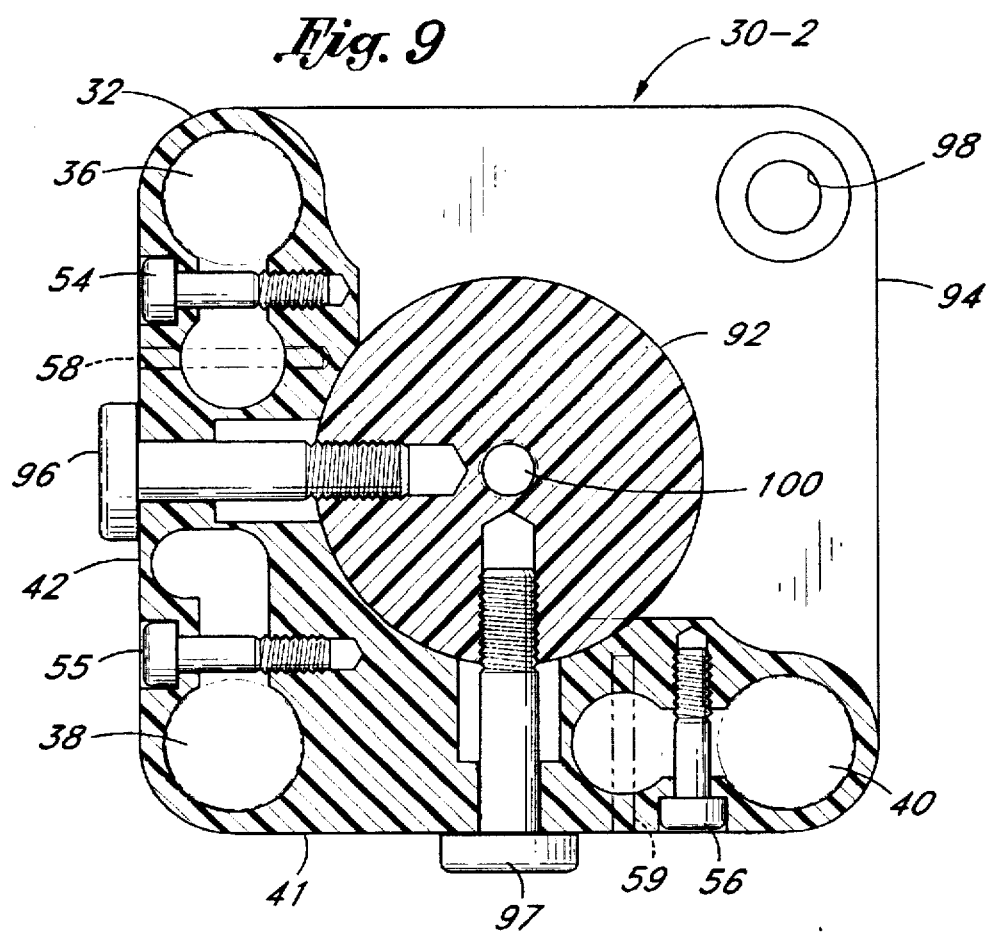
FIG. 9 is a cross section of the optical mount of FIG. 8.

A modification of the precision optical mounts 30 and 30-1 of FIGS. 3–6 is now disclosed while referring to FIGS. 7–9 of the drawings. While both the optical mounts 30 and 30-1 have been described as being disposed vertically and standing upwardly when attached to a support surface, the modified optical mount 30-2 is adapted to be disposed horizontally above a support surface. To accomplish the foregoing, a thick (e.g. 15 mm) adapter disk 92 is coupled to the stationary back plate 32 of optical mount 30-2. As is best shown in FIGS. 8 and 9, a pair of mounting screws 96 and 97 extend through the mounting holes 52 and 53 of back plate 32 to engage the adapter disk 92 and thereby secure the adapter disk 92 so as to be cradled by the L-shaped legs 41 and 42 of back plate 32. Being that the back plate 32 of optical mount 30-2 is identical to the back plates of optical mounts 30 and 30-1, identical reference numbers will be used throughout this part of the description.

However, the generally C-shaped face plate 34 of the optical mounts 30 and 30-1 is replaced by a solid rectangular face plate 94 in the optical mount 30-2. Like the aforementioned C-shaped face plate, the rectangular face plate 94 is coupled in spaced facing alignment to the stationary back plate 32 by a pair of plate retaining springs 89 and 90 so that face plate 94 can be moved (i.e. tilted and/or translated) relative to the back plate 32. Similarly, one corner of the face plate 94 includes a first hole 74-1 in which to receive and retain a flat pad 76, and a diametrically opposite corner of face plate 94 includes a second hole 78-1 in which to receive a pair of pins 79 and 80 via pin holes 81-1 and 82-2. A third hole 84-1 is conically shaped and located at a corner of face plate 94 that is between the diametrically opposite holes 74-1 and 78-1. A counterbored through hole 98 is formed at the corner of face plate 94 that is diametrically opposite the corner at which conically shaped hole 84-1 is located so that optical or mechanical components can be coupled to face plate 94. The pad 76 within hole 74-1, the pins 79 and 80 within hole 78-1, and the conical hole 84-1 of the rectangular face plate 94 of optical mount 30-2 cooperate with the actuators 44 and 46 and the pivot bushing 48 to perform the identical functions as performed by these same elements that are also associated with the optical mount 30.

The rectangular face plate 94 of optical mount 30-2 also includes a centrally disposed counterbored through hole 99 at which additional components can be coupled to face plate 94 and a pair of spring receiving pockets 85-1 and 86-1. A corresponding pair of spring retaining pins 87 and 88 extend laterally through respective spring receiving pockets 85-1 and 86-1 to cooperate and retain first ends of the plate positioning springs 89 and 90. The second ends of the plate positioning springs 89 and 90 are retained by spring retaining pins 58 and 59 which extend through respective pin holes 60 and 61 of the stationary back plate 32.

The rectangular face plate 94 of optical mount 30-2 establishes a horizontal mounting platform that can be attached to a table, a post or any other support surface. To accomplish the foregoing, a threaded hole 100 is formed axially through the adapter disk 92. A cylindrical rod (not shown) having a threaded end is connected between the support surface and the threaded hole 100 in the adapter disk 92, whereby to retain the face plate in adjustable horizontal alignment above the support surface so that an optical element (e.g. a prism) can rest upon the plate 94. A clamp (also not shown) may be located in the corner through hole 98 of rectangular face plate 94 in order to reliably hold the optical element on top of the horizontally disposed plate 94. The movement of the rectangular face plate 94 relative to the L-shaped back plate 32 of optical mount 30-2 to position the optical element is identical to that which has already been described.

Turning now to FIGS. 10–12 of the drawings, there is shown another horizontal mounting platform which, like the optical mount 30-2 of FIGS. 7–9, can be affixed to a support surface such as a table or a post so that a prism, or the like, can rest thereupon. However, while the adapter disk 92 of optical mount 30-2 is coupled to a stationary back plate 32, a solid, generally D-shaped mounting platform 102 is otherwise coupled to the C-shaped moveable face plate 34. Being that the face plate of 34 of FIGS. 10–12 is identical to the moveable face plate 34 of optical mounts 30 and 30-1 of FIGS. 3–6, identical reference numerals will be used throughout this part of the description. Moreover, while only the moveable face plate is shown in FIGS. 10–12, it is to be understood that such face plate 34 is coupled to and adapted to be moved (i.e. tilted and translated) relative to the L-shaped stationary back plate 32 of optical mounts 30 and 30-1 in precisely the same manner that has been earlier disclosed.

In this case, the mounting platform 102 of FIGS. 10–12 has an arcuate body that is shaped to fill in and complete the C-shaped face plate 34 so that face plate 34 will be converted into a substantially continuous rectangular platform when in the assembled relationship of FIG. 11. That is to say, instead of supporting an optical element 68, the C-shaped face plate 34 now receives and retains the mounting platform 102. More particularly, mounting platform 102 includes a through hole 104 that is centrally disposed in the arcuate body of platform 102 and performs an identical function to that performed by the hole 99 through rectangular face plate 94 of optical mount 30-2. A counterbored through hole 106 is located at a top corner of mounting platform 102 to perform the same function as that performed by the through hole 98 through the top corner of the aforementioned rectangular face plate 94. The opposite bottom corner of platform 102 tapers downwardly into a first reference contact point 108. A screw cavity 110 projects downwardly from the top of platform 102 such that a second reference contact point 112 is formed at one edge of cavity 110.

FIG. 11 shows the D-shaped mounting platform 102 coupled to the moveable face plate 34 such that the arcuate body of mounting platform 102 is cradled by the optics carrying seat 70, although platform 102 now replaces the optical element (e.g. mirror 68) that is supported at the optics carrying seat 70 of optical mounts 30 and 30-1. The mounting platform 102 is simply dropped into the optics carrying seat 70 of face plate 34 so that the arcuate body is supported by the hard optic contacts 71 and 72. The first reference contact point 108 of mounting platform 102 is located along the bottom of the face plate 34, and the screw cavity 110 is located under the screw hole 66 in face plate 34. When the retaining screw 62 is moved through the screw hole 66, the nylon tip 64 thereof will be received by the screw cavity 110 to conveniently and detachably connect the mounting platform 102 to the moveable face plate 34 so that any movement imparted to face plate 34 is simultaneously transferred to platform 102 and the optical element resting thereon.

FIGS. 13–15 of the drawings show a precision mirror mount (designated 30-3 in FIG. 15) in which a modification is made to the mounting platform 102 of FIGS. 10–12 so that true gimballed motion of an optical element can be achieved. In this case, an optics holder 120 is coextensively connected to the mounting platform 102-1 opposite the arcuate body thereof. Like the improvement of FIGS. 10–12, the arcuate body of mounting platform 102-1 is dropped into the optics carrying seat 70 of removable face plate 34 so that platform 102-1 is supported by hard optic contacts 71 and 72, and the retaining screw 62 is received at screw cavity 110 to detachably connect platform 102-1 and the optics holder 120 carried thereby to face plate 34.

Also like the improvement of FIGS. 10–12, the moveable face plate 34, to which optics holder 120 is coupled by means of mounting platform 102-1, is correspondingly coupled and adapted to be moved relative to the stationary back plate 32 of optical mount 30-3. However, in the case of FIGS. 13–15, the mounting platform 102-1 no longer functions to provide a horizontal alignment of the optical mount relative to a support surface. Therefore as with the optical mounts 30 and 30-1, the moveable back plate 34 of optical mount 30-3 will be disposed in vertical, upstanding alignment with its support surface. Accordingly, the holes 104 and 106 of mounting platform 102 are deleted from the mounting platform 102-1.

Optics holder 120 has a hollow cylindrical body in which to receive an optical element 68. However, as shown in phantom lines in FIG. 13, a portion of optics holder 120 can be removed to further reduce the width and improve the optical efficiency of the optical mount 30-3 in which the optics holder 120 is used. The optical element 68 received by optics holder 120 may be identical to that shown and described while referring earlier to FIG. 3 and, therefore, an identical reference numeral is used. A peripheral lip 122 extends around the interior of optics holder 120 against which the back side of optical element 68 is positioned. A screw hole 124 is formed through the top of the optics holder 120 in which to receive a nylon tipped optics retaining screw 126 that is identical to retaining screw 62. The optics retaining screw 126 is moved downwardly through screw hole 124 to engage and releasably secure the position of the optical element 68.

As an important advantage of the modification of FIGS. 10–12, when the optics holder 102-1 is dropped into the optics carrying seat 70 and coupled to the moveable face plate 34 as shown in FIG. 14, the optical element 68 will be automatically positioned to achieve true gimballed motion. That is to say, and as is best represented by the dotted reference line 128 in FIG. 15, the pivot points at which the moveable face plate 34 is tilted or rotated when a pair of the modular actuators (e.g. 49, 50 or 50, 51 of FIG. 4) travel the same distance are aligned with the front face of the optical element 68. However, the point at which the optical element 68 is secured (by means of retaining screw 126) is offset from reference line 128. In this regard, it may be appreciated that the front face of optical element 68 is positioned to receive an incident beam of optical energy at a location that corresponds with the plane containing the pivot points at which the modular actuators of the stationary back plate 52 contact the moveable face plate 34 to impart a gimballed tilt thereto.

In other words, the front face of optical element 68 and the point or points at which the position of the moveable face plate 34 is adjusted relative to the stationary back plate 32 are coplanar. This coplanar alignment provides the distinct advantage that gimballed motion is imparted to the optical element 68 at its face rather than at the point where the optical element is secured to optics holder 120, as is otherwise common to conventional mirror mounts like that described in U.S. Pat. No. 5,140,470 issued Aug. 18, 1992 to Frances S. Luecke.

By way of another important advantage of the modification of FIGS. 13–15, it may also be appreciated that the combination of mounting platform 102-1 and optics holder 120 facilitates a rapid and easy interchange of optical elements (e.g. 68) in the optical mount 30-3. By simply loosening the retaining screw 62 in face plate 34, the mounting platform 102-1 may be removed and replaced by a different platform in which a different optical element is carried by the optics holder thereof. Thus, the mounting platform 102-1 has the characteristic of a puzzle piece to be cradled by moveable face plate 34 so that any one of a variety of optical elements can be selectively coupled to the face plate 34 for repeatable positioning therewith.

Figure 2:
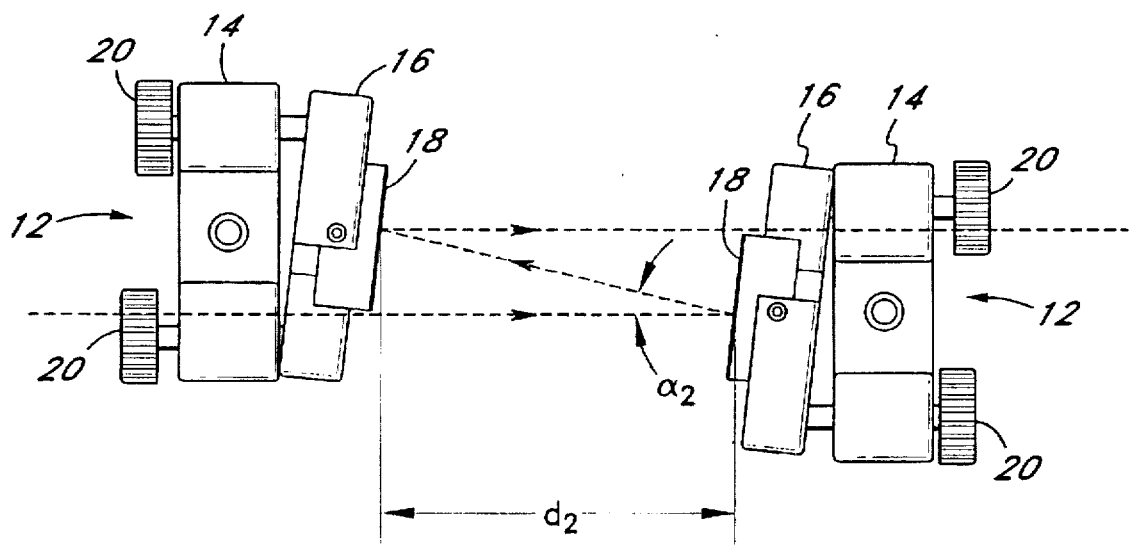
FIG. 2 shows an optical system in which a pair of optical mounts according to the present invention are arranged to reflect a beam of optical energy therebetween.

Referring now to FIG. 2 of the drawings, a pair of optical mounts 12 are shown for reflecting an incident beam of optical energy. The optical mounts 12 may be any one of upstanding, vertically disposed precision optical mounts 30, 30-1, or 30-3 that has been described above. It can now be appreciated that by virtue of the L-shaped stationary back plate 14 and the C-shaped moveable face plate 16 of optical mount 12, there exists a clear or open quadrant in the optical mount 12 through which a beam of optical energy can be transmitted without the risk that the beam will be intercepted and blocked, as is otherwise the case with the conventional optical mount 1 of FIG. 1, wherein the back and face plates are of solid rectangular construction.

More particularly, at least one corner of each of the back and face plates 14 and 16 is removed from the optical mount 12 of FIG. 2 with the advantageous result that the distance $d_2$ between the opposing optical mounts 12 can be shortened relative to distance $d_1$ between the optical mounts 1 of FIG. 1. Moreover, the optical elements 18 of mounts 12 can be adjusted by rotating the knobs 20 to produce a smaller angle of reflection $\alpha_2$ than the corresponding angle of reflection $\alpha_1$ produced by the optical elements 6 of FIG. 1. By virtue of the foregoing, the space consumed by a pair of opposing optical mounts 12 of FIG. 2 is reduced to make for a more efficient optical system without increasing optical distortion.

It will be apparent that while the preferred embodiments of this invention have been shown and described, various modifications and changes made without departing from the true spirit and scope of the invention. For example, although reference has been made to moving and stationary plates, this is for the purpose of illustration, only. Either one of the back and face plates of the precision optical mounts described above may be considered as the moveable and/or the stationary plate.

Having thus set forth the preferred embodiments, what is claimed is:

1. An optical mount for supporting and positioning an optical element with regard to a beam of optical energy, said optical mount comprising:

a first plate to carry said optical element;

a second plate coupled to said first plate in spaced, opposing alignment therewith; and plate positioning means extending from said second plate to contact said first plate, said plate positioning means being moveable relative to said first plate to impart a corresponding movement to said first plate and to said optical element carried thereby;

each of said first and second plates having at least one pair of legs that are joined to one another at a point of intersection and an open area that is surrounded by said pair of leas and extends to a location that is diagonally opposite said point of intersection so that the beam of optical energy can pass uninterrupted through said open area of each of said first and second plates.

2. The optical mount recited in claim 1, wherein said first plate has a C-shape.

3. The optical mount recited in claim 1, wherein said second plate has an L-shape.

4. The optical mount recited in claim 1, wherein said plate positioning means includes a plurality of actuators that are rotatable in and translatable laterally through said second plate, a first and a second of said plurality of actuators being respectively located at the ends of said at least one pair of legs which are opposite said point of intersection.

5. The optical mount recited in claim 1, wherein said optical element is located at and supported within a semi-circular optics carrying seat of said first plate so that said optical element is cradled by said at least one pair of legs of said first plate.

6. The optical mount recited in claim 5, wherein said optical element is suspended within said semi-circular optics carrying seat by means of a first contact point projecting from one end of said optics carrying seat, a second contact point projecting from the opposite end of said optics carrying seat, and a third contact point projecting from said optics carrying seat at a location between said first and second contact points.

7. The optical mount recited in claim 6, wherein said first contact point is a nylon tipped retaining screw projecting radially inward from said one end of said semi-circular optics carrying seat to engage and releasably retain said optical element thereat.

8. An optical mount for supporting and positioning an optical element with respect to a beam of optical energy, said optical mount comprising:

a first plate having top and bottom faces and a pair of legs that are joined to one another, the top face of said second plate being coupled in spaced, opposing alignment to the bottom face of said first plate;

plate positioning means extending from said second plate to contact the bottom face of said first plate, said plate positioning means being moveable relative to said first plate to impart a corresponding movement to said first plate and to said optical element that is received at the top face of said first plate; and adapter means attached to said second plate and cradled between said pair of legs thereof, said adapter means adapted to be connected to a support surface so that said optical element rests upon the top face of said first plate at which to receive the beam of optical energy.

9. The optical mount recited in claim 8, wherein said first plate has a rectangular shape.

10. The optical mount recited in claim 8, wherein said second plate has an L-shape.

11. The optical mount recited in claim 8, wherein said adapted means is a disk, said optical mount further comprising fastener means by which to attach said disk to said second plate to be cradled by said pair of legs thereof.

12. The optical mount recited in claim 11, wherein said adapter disk has a hole extending axially therethrough, said adapter disk adapted to be connected to the support surface from said axially extending hole.

13. The optical mount recited in claim 8, wherein said plate positioning means includes a plurality of actuators that are rotatable in and translatable laterally through said second plate, a first and a second of said plurality of actuators being respectively located at the ends of said pair of legs opposite the ends which are joined to one another.

14. An optical mount for supporting and positioning an optical element with respect to a beam of optical energy, said optical mount comprising:

a first plate to carry said optical element, said first plate having a series of legs that are joined end-to-end one another;

a second plate coupled to said first plate in spaced, opposing alignment therewith;

plate positioning means extending from said second plate to contact said first plate at at least two different points, said plate positioning means being moveable relative to said first plate to impart a corresponding movement to said first plate and to said optical element carried thereby; and a mounting platform detachably connected to said first plate and cradled between said series of legs thereof, said mounting platform supporting said optical element.

15. The optical mount recited in claim 14, wherein said first plate has a C-shape.

16. The optical mount recited in claim 15, wherein said mounting platform has an arcuate body to be received within and surrounded by said C-shaped first plate.

17. The optical mount recited in claim 14, wherein said mounting platform has a screw receiving cavity formed therein, said optical mount further comprising a mounting screw extending through said first plate to engage said mounting platform at said screw receiving cavity thereof to detachably connect said mounting platform to said first plate.

18. The optical mount recited in claim 14, further comprising an optics holder connected to said mounting platform, said optics holder engaging said optical element so that said optical element is attached to said first plate by way of said mounting platform.

19. The optical mount recited in claim 18, wherein said optical element engaged by said optics holder is a mirror having a face at which to receive the beam of optical energy, the face of said mirror being coplanar with each of said at least two different points at which said plate positioning means extending from said second plate contacts said first plate.

20. The optical mount recited in claim 19, further comprising a retaining screw extending through said optics holder to engage and releasably retain said mirror, the point at which said retaining screw engages said mirror being offset from the coplanar alignment of said mirror face and each of said at least two different points at which said plate positioning means contacts said first plate.

* * * * *